US008677348B1

(12) United States Patent
Ramanathpura et al.

(10) Patent No.: US 8,677,348 B1
(45) Date of Patent: Mar. 18, 2014

(54) METHOD AND APPARATUS FOR DETERMINING LEAST RISK INSTALL ORDER OF SOFTWARE PATCHES

(75) Inventors: Manjunatha N. Ramanathpura, Cambridge, MA (US); Thomas N. Cobb, Bedford, MA (US); Paul J. Russell, Clinton, MA (US); Christopher S. Warren, Chelmsford, MA (US); Ryan J. Schuft, Tyngsboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 1382 days.

(21) Appl. No.: 11/252,529

(22) Filed: Oct. 17, 2005

(51) Int. Cl.
*G06F 9/445* (2006.01)

(52) U.S. Cl.
USPC .......................................................... 717/175

(58) Field of Classification Search
USPC .......................................................... 717/175
See application file for complete search history.

(56) References Cited

U.S. PATENT DOCUMENTS

| | | | |
|---|---|---|---|
| 5,790,856 | A | 8/1998 | Lillich |
| 6,243,766 | B1 | 6/2001 | Sliger et al. |
| 6,367,075 | B1 | 4/2002 | Kruger et al. |
| 6,381,742 | B2 | 4/2002 | Forbes et al. |
| 6,477,703 | B1 * | 11/2002 | Smith et al. ................... 717/168 |
| 6,735,757 | B1 | 5/2004 | Kroening et al. |
| 6,859,923 | B2 | 2/2005 | Taylor |
| 6,938,109 | B1 | 8/2005 | Sliger et al. |
| 6,954,928 | B2 * | 10/2005 | Allsop et al. .................. 717/168 |
| 7,185,332 | B1 | 2/2007 | Waldin et al. |
| 7,343,599 | B2 | 3/2008 | Panjwani |
| 7,386,846 | B2 | 6/2008 | Rajaram |
| 2002/0100036 | A1 | 7/2002 | Moshir et al. |
| 2003/0218628 | A1 | 11/2003 | Deshpande et al. |
| 2003/0220992 | A1 | 11/2003 | DiRico |
| 2004/0003390 | A1 | 1/2004 | Canter et al. |
| 2004/0015946 | A1 | 1/2004 | Te'Eni et al. |
| 2004/0230828 | A1 | 11/2004 | DeFuria et al. |
| 2005/0050538 | A1 | 3/2005 | Kawamata et al. |
| 2005/0071838 | A1 | 3/2005 | Hatasaki |
| 2005/0257208 | A1 | 11/2005 | Blumfield et al. |
| 2006/0020938 | A1 | 1/2006 | Elcock et al. |
| 2006/0048129 | A1 | 3/2006 | Napier et al. |
| 2006/0048130 | A1 | 3/2006 | Napier et al. |
| 2006/0048131 | A1 | 3/2006 | Napier et al. |
| 2006/0130040 | A1 | 6/2006 | Subramanian et al. |

(Continued)

OTHER PUBLICATIONS

Brandman, et al., "Patching the Enterprise," *Queue*, 8 pages (Mar. 2005).

(Continued)

*Primary Examiner* — Wei Zhen
*Assistant Examiner* — Lanny Ung

(57) ABSTRACT

A method or apparatus determines an order for installing software patches by comparing information in the software patches. The information may include files created or modified to fix software errors in a software program and metadata referring to the files. By comparing the information, the method or apparatus may determine whether at least two of the software patches include files in common. Based on the results of comparing the information, the method or apparatus may automatically determine an order for installing the software patches into the software program. The files in a given software patch may be used to fix unrelated software errors. The metadata may refer to a time at which the files in the software patches were created or modified, and the order of installation may occur in a chronological manner based on creation or modification dates.

33 Claims, 5 Drawing Sheets

(56) References Cited

U.S. PATENT DOCUMENTS

2007/0033635 A1\* 2/2007 Hirsave et al. .................. 726/1
2007/0038991 A1   2/2007 Schuft et al.
2007/0169073 A1   7/2007 O'Neill et al.

OTHER PUBLICATIONS

Hudepohl, et al., "Emerald: Software Metrics and Models on the Desktop," *IEEE Software*, 5 pages (Sep. 1996).

\* cited by examiner

METHOD AND APPARATUS FOR DETERMINING LEAST RISK INSTALL ORDER OF SOFTWARE PATCHES

BACKGROUND OF THE INVENTION

In general, software patches are either cumulative or non-cumulative. In the former case, a software patch ("patch") includes previous patches released for a software product. In the latter case, the patches are independent fixes and do not include any previously released patches.

There may be different business reasons why one cannot always use cumulative patches. The reasons may include an amount of development, testing, and validation time involved to test the cumulative patches.

Non-cumulative patches may be referred to herein as Engineering Special (ES) patches, or just "ES's." Often, engineering special patches that are built on a given release have one or more files or components in common with other engineering special patches for the same release. If there is a need for installing more than one ES on a given system, one ES might overwrite the changes done by another ES. Therefore, there is a risk that multiple ES's may not be compatible with each other. It often becomes a challenge to determine in what order the ES's should be installed in order to avoid a risk of overwriting changes by one ES with another ES. It may also become a challenge to determine which ES's need to be tested for compatibility.

BRIEF DESCRIPTION OF THE DRAWINGS

The features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
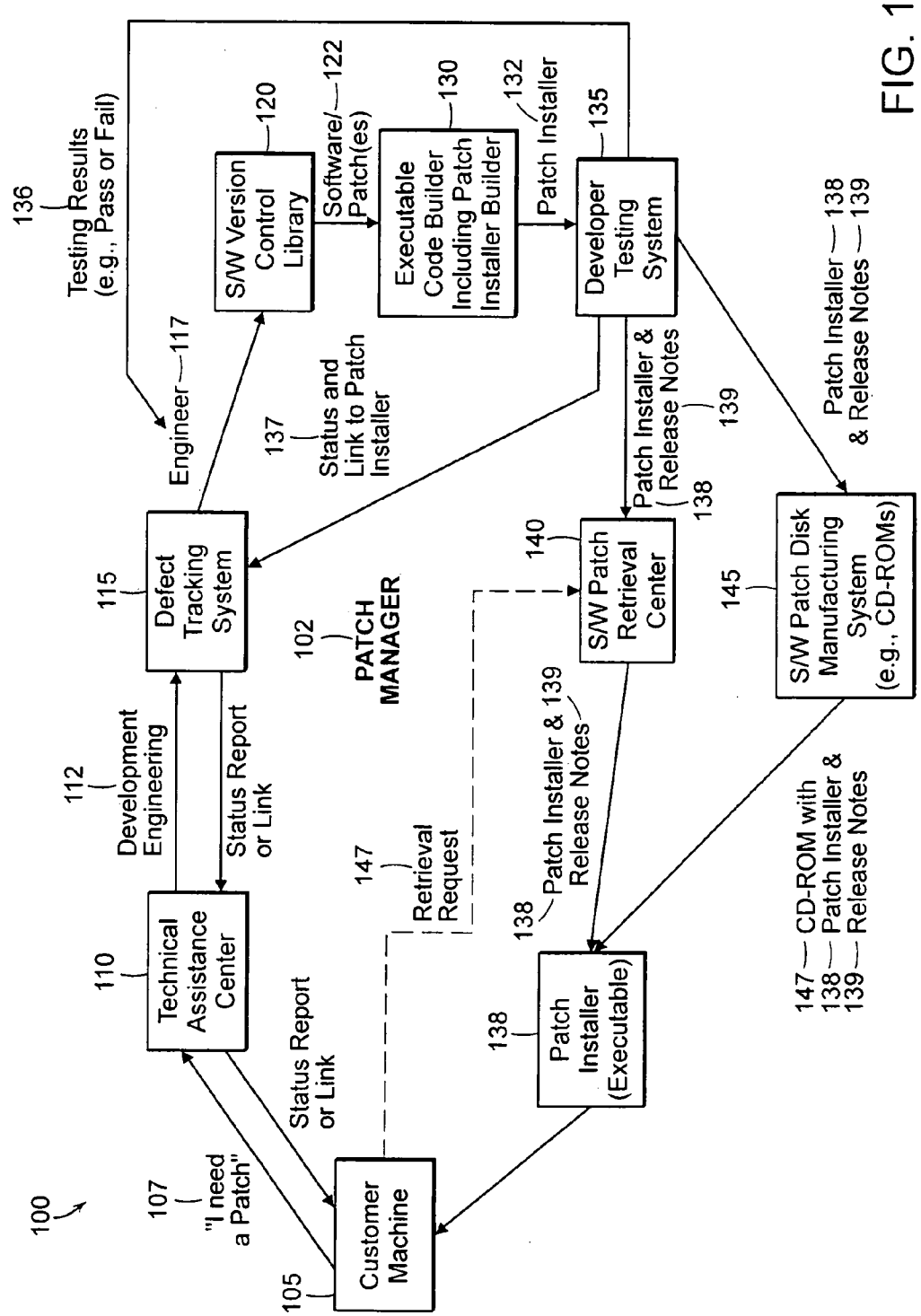
FIG. 1 is a block diagram of a network in which an embodiment of the present invention may be employed.

A description of preferred embodiments of the invention follows.

Software patches, or just "patches," are used to update or correct a problem with a computer program. Non-cumulative patches, also referred to herein as "engineering specials" or just "ES's," are not intended to be installed with other engineering specials. While multiple ES installs (i.e., installing a first ES, second ES, third ES, and so forth in a serial manner) are possible, a risk of a conflict or collision between ES's goes up with each new ES added to a system. It is highly recommended that customers install no more than one engineering special in a system at a time. However, if one prefers to install more than one engineering special at a time, a report presenting a least risk install order or level of risk can be helpful. Such a report is referred to herein as a "collisions report."

An ES collisions report can help make a decision on an order of installing a given ES or testing a given ES with other ES's for compatibility. The collisions report in no way confirms or guarantees that the ES's will work with no issues. But, if the ES's are installed in the suggested install order, the suggestions help lower the risk level and narrow the number of testings one may need to do. The only way to guarantee the install order is "safe" (i.e., all ES's are compatible with every other and the software in the system being "patched") is by testing each ES for compatibility on the system and, in the case of multiple ES's, by testing the ES's with all ES's installed on the system, as understood in the art.

Many of the ES's that are built on a given release share one or more files or components with other ES's that are already released for the same base release. ES's are not cumulative, and they are not tested for their compatibility with other ESs. As a result, there is a risk that a given ES is not compatible with one or more other ES's due to lack of testing or lack of understanding on what order one should install a given ES. This issue is referred to herein as ES collision.

ES collisions reports help a patch manager (i.e., a software system used to manage patches and installation of patches) identify whether a given ES has any overlapping files or components with any of the other ES's that are built or being built on the same service release (SR), maintenance release (MR), or first customer shipped (FCS) release.

ES collisions reports may be used by engineers or automated software tools to determine the least-risk install order. Situations the collisions report is useful is when there are too many ES's built for a system, and it is hard to keep track what order should one should proceed to install the ES's. For example, if a software developer has to give multiple ES's to a customer or if a customer has several ES's and wants another ES, one cannot be sure if another ES is going to conflict with existing ES's on the customer's system.

The collisions report may also provide detailed information to a developer to determine what other ES's the developer's ES is sharing files or components with to help the developer make sure the developer's ES is safe with the other ES's.

The ES collisions report's scope may be restricted to a given ES because, by definition, an ES collisions report generates a list of ES's and their files/components that overlap with the given ES along with least risk install order and risk level. The collisions report is preferably relative to the individual ES one is interested in assessing compatibility for, and, thus, the collisions report may have no meaning outside the given ES's viewpoint. The reference ES may be referred to as the "base" ES.

It is possible to view the least risk install order for all the ES's that are built on a given service release or maintenance release (SR/MR), or other release, such as a base release, minor release, major release, "featurette," or more generally any type of software program or system or aggregate software program or system that can have an ES installed. The collisions report gives list of all the ES's that are built on a given SR/MR and sorted based on least risk install order. The collisions report may list the number of ES's with which each ES overlaps, along with the list of those ES's.

The following table describes the fields available in a typical ES collisions report.

| Field Name | Description |
| --- | --- |
| Least Risk install order | Displays a least risk install order for the given ES with respect to other ES's built on the same release. |
| Built Time | Time at which the ES source code was built. |
| Name | Name of the patch that overlaps with the ES in question (i.e., base ES), either by file or component or both. |
| Status | Status of the patch that overlaps with the base ES. |
| File Overlaps | Displays a list of deliverable files that overlap with the base ES. |
| Component Overlaps | Displays a list of components that overlap with the base ES. |
| Risk Level | Displays a risk level of installing the base ES to a system that already has one of the overlapping ES on it. The risk level can take at least one of multiple (e.g., four) values:<br>Low risk - If the overlapping ES is built before the base ES.<br>Requires Testing - If the overlapping ES is built after the base ES.<br>Very Low Risk - If the ES does not overlap with the base ES, but the ES is built on the same release.<br>N/A - Not applicable |

An embodiment of the present invention includes a method or apparatus to determine if a given software patch overlaps with one or more other patches and to identify a least risk install order programmatically. Determining if a given Engineering Special (ES) patch shares files or components with another ES and determining a least risk install order for these ES's may use extensive data that is collected by a software patching system, which may be a commercial or custom system, also referred to herein as a "patch manager." For example, such data may include data regarding the most recent time source code was compiled for each ES, a list of files selected for each ES, or other data regarding components or files in the software patches.

An example method or apparatus used for determining a least risk order may include (i) iterating through a list of all files or a subset of files that are included in each ES for a given release and (ii) determining a subset of ES's that share at least one file. Once the list of ES's that overlap with one another is determined, the technique may again iterate the list and sort a subset of the files based upon a time, for example, at which the source code was compiled. The technique may then assign an order of installing each patch.

An embodiment of the method or apparatus may be programmatically implemented as part of the patch manager so that users can dynamically generate the list of overlapping ES's and determine the least risk install order.

An embodiment of the method or apparatus may determine an impact of installing a given non-cumulative software patch together with one or more other non-cumulative patches built on a same code branch (i.e., a branch in development of a software program). The method or apparatus may provide a user with an ability to determine the install order with the least risk of multiple patches canceling out each other's changes or otherwise making the software program being patched unstable.

There may be several advantages of using an embodiment of a method or apparatus employing the principles, or subset thereof, of the present invention at different stages of a patch's period of usefulness. Examples of such advantages include:

a. at the time of installing ES patches on a system, if there is a need for installing more than one patch, a report helps in determining in what order the patches should be installed in order to avoid overwriting changes from one ES with changes of another ES; and b. during development and testing, an embodiment of the method or apparatus gives opportunity for engineers to determine if their ES overlaps with one or more ES's built in the past and helps the engineers narrow a number of tests they need to perform for compatibility testing.

ES patches (i.e., non-cumulative patches) for a given release may be compiled on the same source branch. In other words, if two patches edit the same file, the latter patch most likely contains the changes from the former patch. This information may be used in determining the least risk install order.

For example, assume there are two patches, patch A and patch B, both modifying the same file, and patch A is compiled before patch B. When there is a need for installing both patches on the same system, the risk level in installing patch B after installing patch A is less than in the other order because both are compiled on the same source branch, and patch B was compiled after patch A.

This logic may be programmatically implemented in such a way that, even if a patch is compiled multiple times, the program may make sure to get the last compilation time for calculating the least risk install order. The reason why the term "least" is used is because, even though there may be a chance that the change gets carried over from the first patch to the second patch, it is possible that the later installed patch might make changes that destabilize the earlier installed patch. Non-cumulative patches may not necessarily be tested for all of the previous patches because of time and resource constraints involved in creating or supporting these types of patches.

An embodiment of the present invention may include a method or apparatus for determining an order for installing software patches. The method or apparatus may compare information in multiple software patches, where the information may include (i) files created or modified to fix software errors in a software program and (ii) metadata referring to the files, to determine whether at least two of the multiple software patches include files in common. Based on the results of the comparison of the information, the method or apparatus may automatically determine an order for installing the software patches into the software program.

In one embodiment, the files in a given software patch may fix unrelated software errors. At least a subset of the files in at least a subset of the software patches may be different versions of the same files.

In some embodiments, the method or apparatus may automatically determine the order by sorting the files based on creation or modification date stored in the metadata and set the order of installation to be chronological, for example. The software patches may correct operation of the software program in multiple versions of the software program.

The method or apparatus may generate a master software patch, including the files in the determined order, for installing the software patches. Automatically determining the order may include: (a) determining an order for installing the software patches with minimized risk of (i) overwriting a file written at a later date with the same file written at an earlier date or (ii) introducing a software error corrected in the file written at the later date and (b) generating the master software patch with the order having the minimized risk.

In some embodiments, the method or apparatus may automatically determine the order that includes reducing a risk of reintroducing at least one of the software errors in the software program or introducing a new software error in the software program. The software patches may further include components (e.g., audio or video file groupings with respective formatting) including files, and the least risk order of installing the patches takes the components into account. The method or apparatus may further comprise comparing metadata referring to the components and automatically determine the order of installation based on results of comparing the metadata.

In some embodiments, automatically determining the least risk order may include determining metrics representing risk of reintroducing the software errors or introducing new software errors. The software patches may be associated with multiple branches of development that cannot be concurrently installed to correct the errors in the software program in a manner resulting in error-free operation of the software program. In some embodiments, the metadata may include the time at which the files were created or modified, and the order of installation may be defined on that basis.

FIG. 1 is a block diagram of an example network 100 that may employ an embodiment of the present invention. The example network 100 may include a customer machine 105 (e.g., server) having access to a technical assistance center 110 via a computer network, such as the Internet (not shown). The technical assistance center 110 is in communication with a defect tracking system 115 that collects information received from customers via the technical assistance center 110. The defect tracking system 115 is in communication with a software version control library 120 that stores source code that has typically been extensively tested and is considered "release" version(s).

In the example network 100, the software version control library 120 is in communication with an executable code builder 130, which produces patch installers among other executable code. The executable code builder 130 is in communication with a developer testing system 135 that can be used to test executable code or a patch installer built by the executable code builder 130. The developer testing system 135 is in communication with a software patch retrieval center 140, which is accessible to the customer machine 105 via the network (not shown) and also in communication with a software patch disk manufacturing system 145, which may produce CD-ROM's for use in providing to a customer. The software patch retrieval center 140 or software disk manufacturing system 145 may transfer a patch installer 138 in an executable form to the customer machine 105 for installation of one or multiple patches with a least risk install order.

In operation, a customer at the customer machine 105 may request a patch (step 107) via the technical assistance center 110. A development engineering group 112 may access the technical assistance center 110, identify the request for the patch, and issue a report to the defect tracking system 115.

The defect tracking system 115 may collect the report in a variety of ways, such as through a text-based database, that can be used to assist a development engineer 112 in making the report or to determine whether other customers have had requests for similar patches in the past. The request for the patch may be a result of a problem identified by the customer, which may also be issued to the technical assistance center 110 and entered into the defect tracking system 115 by the development engineer 112 for data collection or correlation purposes.

The defect tracking system 115 may be automated and request a particular set of software modules from the software version control library 120. Alternatively, an engineer 117 may inspect information entered into the defect tracking system 115 and select a given set of software modules from the software version control library 120 to create a software patch for solving the problems with the customer machine 105. In either case, one or more software patches 122 may be sent by the software version control library 120 to the executable code builder 130 for building a patch installer 132 or other software code executable module.

After receiving the patch installer 132, the developer testing system 135 may return a status and link to the patch installer 132 via a message 137 to the defect tracking system 115, where the status indicates progress of the creation of the patch installer 132, and the link may be a hot link selectable via a graphical user interface by the customer on the customer machine 105. The message 137 may be returned to the customer machine 105 via the defect tracking system 115 and technical assistance center 110 in the form of an email or other software message available via a computer network.

The developer testing system 135 may be used by an engineer for testing the patch installer 132. The patch installer 132 may be provided by the executable code builder 130 in the least risk install order as described hereinabove and tested by an engineer using the developer testing system 135, or the developer testing system 135 may have intelligence built into it to create or modify the least risk install order or allow the engineer to adjust the least risk install order based on the testing. Feedback in the form of testing results 136 may be provided to the engineer 117 in the form of a "pass" or "fail" indicator, some other indicator, or a metric.

The developer testing system 135 may produce a patch installer 138, possibly the same as the patch installer 132 provided by the executable code builder 130, and optionally produce release notes 139, which may be a text file or other type of file that is usable by the customer for installation or usage purposes of the patch installer or patch. The patch installer 138 and release notes 139 may be passed by the software patch retrieval center 140 to the customer machine or written to a CD-ROM 147, for example, by the software patch disk manufacturing system 145 for delivery to the customer machine 105.

In some embodiments, a centralized patch manager 102 may be used to govern or coordinate operations among the multiple subsystems other than the customer machine 105 illustrated in the example network 100. The patch manager 102 may be an overall system in which submodules (e.g., technical assistance center 110, defect tracking system 115, and so forth) operate or may be an independent software system that communicates with the submodules via typical software module interaction. For purposes of understanding the principles of the present invention, understanding details of the patch manager 102 is unimportant.

Figure 2A:
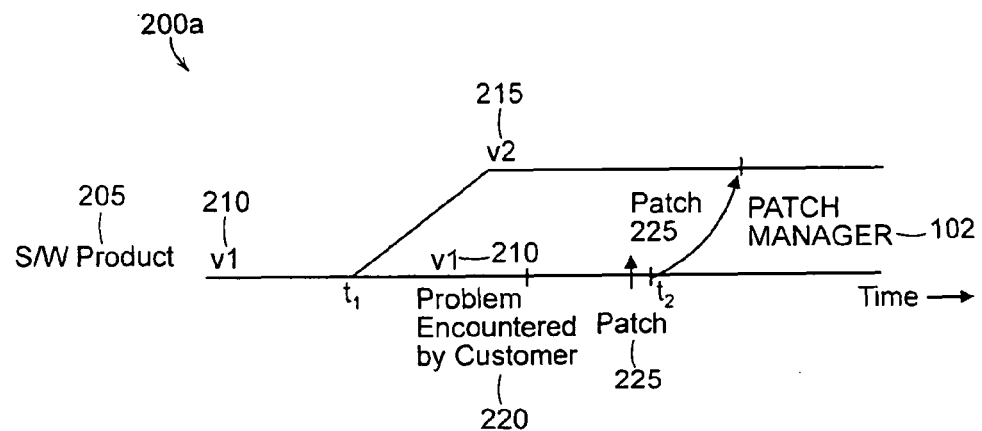
FIGS. 2A and 2B are branch diagrams illustrating example development timelines of a software product used by a customer in the network of FIG. 1.

FIG. 2A is a branch diagram 200a illustrating a first example development cycle of a software product 205. With multiple branches of development, patches cannot be concurrently delivered to multiple customers and installed in their respective software, which may be multiple versions, at the same time. Thus, there is a chance that shipping patches to the multiple customers can cause software bugs based on their software being in different branches of development. A least risk installation order may be useful to avoid introducing or reintroducing software bugs.

Continuing to refer to FIG. 2A, the software product 205 may be released as version 1 (v1) 210. At some point in time, $t_1$, the software product 205 may be re-released as version 2 (v2) 215. Later in the development cycle, a problem may be encountered by a customer 220. Responsive to the problem, the software developer may generate a software patch 225 to solve the problem in the first version 210. At the same time or some later point in time, $t_2$, the patch manager 102 (FIG. 1)

may be used to generate a patch installer to install the patch 225 into the second version 215 of the software product 205.

Figure 2B:
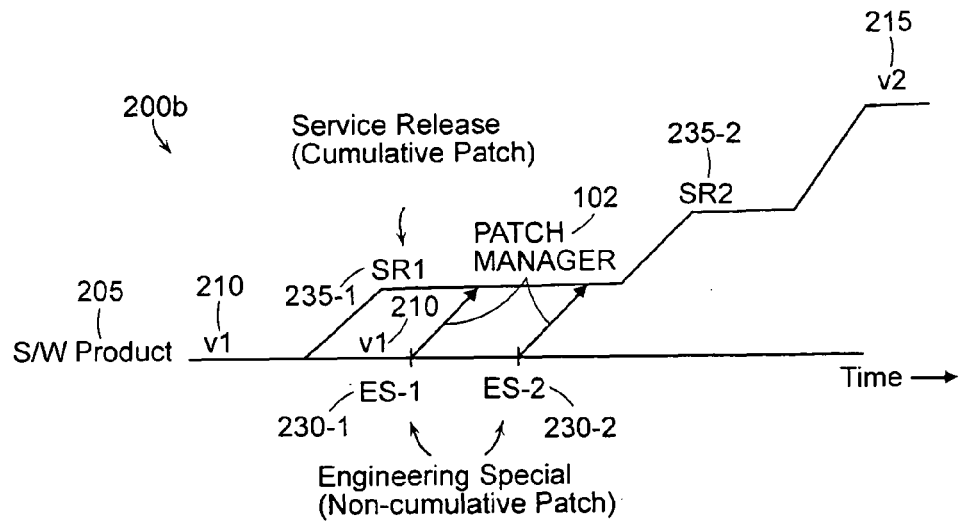

FIG. 2B is a branch diagram of a second example development cycle of the software product 205. In this example, the patch 225 of FIG. 2A may be one of two types of patches, a service release patch, which is a cumulative patch, or an Engineering Special (ES) patch, which is a non-cumulative patch. In the development cycle of FIG. 2B, the software product 205 is upgraded by way of a first service release (SR1) patch 235-1, and at some later time, upgraded by way of a second service release (SR2) patch 235-2. At some later time, a second version 215 of the software is released that may include the service release patches SR1 and SR2 or have the functions of those patches integrated into the software product v2 215 in some other manner. Between the service releases or along the version 1 branch at the base of the branch diagram 200b, Engineering Special patches 230-1 and 230-2 may be provided to a customer and integrated into a different branch, such as the one illustrated with the service release patches 235-1, 235-2, by way of the patch manager 102.

It should be understood that the cases shown in FIGS. 2A and 2B are simple cases, where ordering of the non-cumulative patches is relatively simple. There may be other cases with multiple cumulative patches, versions, or non-cumulative patches with many more branches that can be more complex and require automated programming to determine an ordering for installing the non-cumulative patches.

Figure 3A:
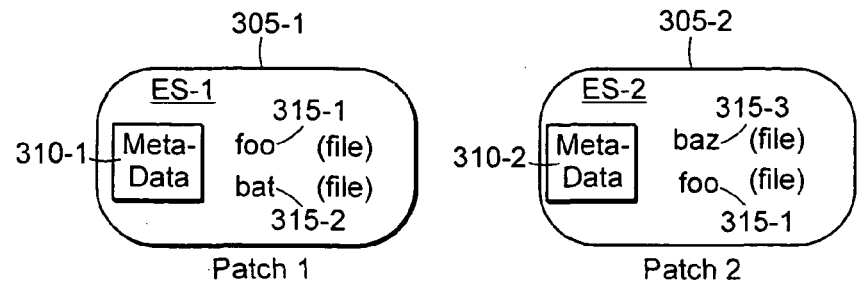
FIGS. 3A and 3B are block diagrams of software patches that may be used to patch a software system used by the customer of FIG. 1.

FIG. 3A is a block diagram of two non-cumulative patches, ES-1 305-1 and ES-2 305-2. Referring first to ES-1 305-1, this non-cumulative patch includes metadata 310-1 that refers to two files, "foo" 315-1 and "bat" 315-2. Similarly, ES-2 305-2 includes metadata 310-2 that refers to two files, "baz" 315-3 and "foo" 315-1. As indicated, there is a common file, "foo" 315-1, continued in both of the Engineering Special patches 305-1 and 305-2. A software program external from the patches 305-1, 305-2 may determine that the two patches have the "foo" file 315-1 in common by way of inspection of the metadata 310-1, 310-2 referring to the files in the patches.

Figure 3B:
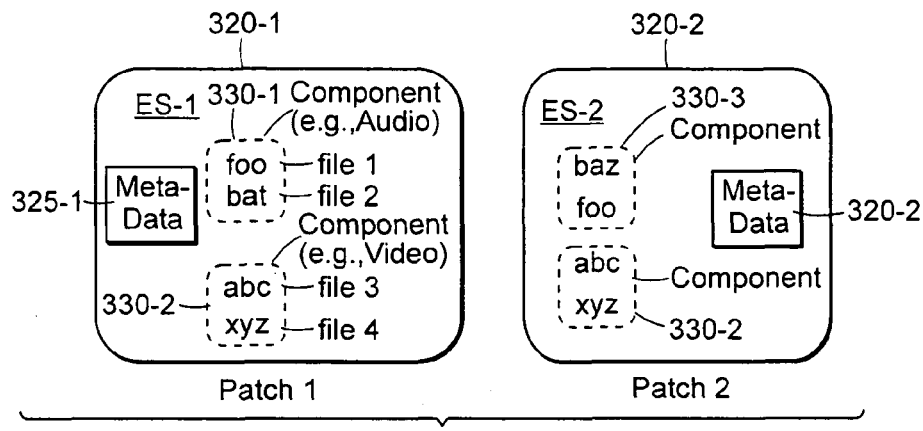

FIG. 3B is a block diagram of another example of the non-cumulative software patches 320-1 and 320-2. In this example, the patches 320-1, 320-2 include components 330-1, 330-2, and 330-3. The components may be audio components that include files to be patched into audio software in a software program into which the patches are to be installed. The components may also be video components that include video files for installation into a video portion of a software program into which the software patches are to be installed. In the example, the first patch 320-1 and the second patch 320-2 include the same component 330-2, which include the same software files, "abc" and "xyz."

Inspection by a processor determining a least risk install order identifies the common component and uses the information in determining the order. For example, if the first patch 320-1 includes a version of the video component 330-2 modified later than the video component 330-2 contained in the second patch 320-2, the least risk order of installation is set at installing the second patch 320-2 prior to installing the first patch 320-1.

Figure 3C:
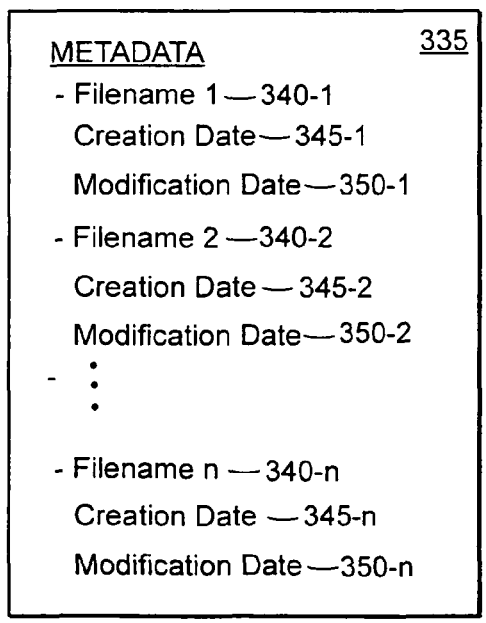
FIG. 3C is a listing of a metadata file used in the software patches of FIGS. 3A and 3B.

FIG. 3C is an example metadata file 335 that includes information about the files and optionally the components, which is not shown. With regard to the files, the metadata file 335 includes file names 340-1, 340-2, . . . , 340n. The metadata file 335 may also include other information about the files, such as creation date 345-1, 345-2, . . . , 345-n and modification dates 350-1, 350-2, . . . , 350-n. Using the same information, a program determining a least risk install order can analyze the metadata to determine that, for example, if the creation date of "filename 1" 340-1 is before the creation date of "filename 2" 340-2, that the installation order is less risky if the file with "filename 1" 340-1 is installed prior to the file with "filename 2" 340-2. This same technique may be used based on modification dates or other metadata relating to the files or components in the patches.

Figure 4:
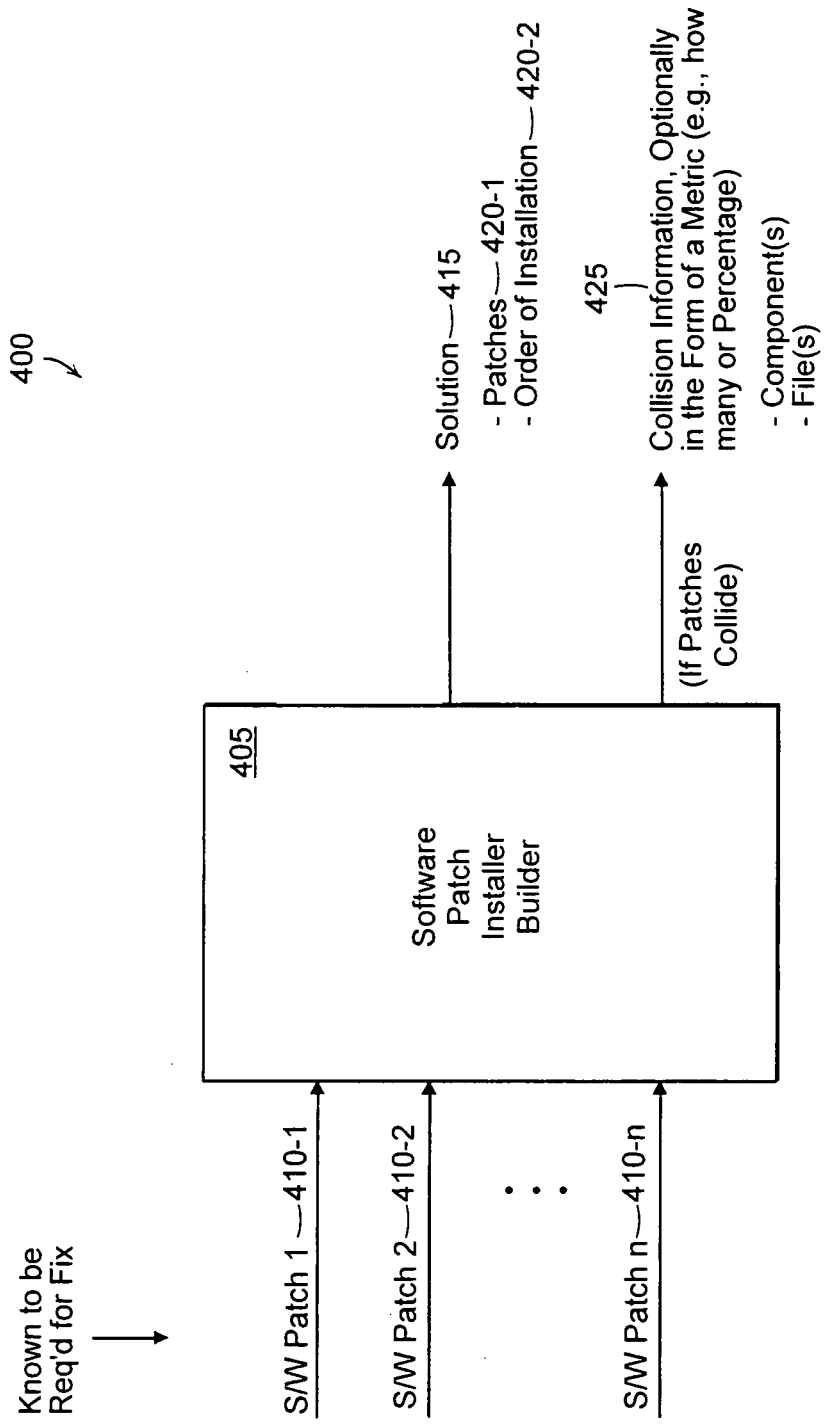
FIG. 4 is a block diagram of a process in which a software patch installer builder is used to determine a least risk install order that may be used in the network of FIG. 1.

FIG. 4 is a block diagram of a subsystem 400 that can be used to determine a least risk install order according to an embodiment of the present invention. Software patches 410-1, 410-2, . . . , 410-n, known to be required for fixing a problem with a software program, may be presented to a software patch installer builder 405 to determine a least risk install order of the patches. The software patch installer builder 405 may determine a solution 415 that includes the patches 420-1 and an order of installation 420-2 that is a least risk order for installing the software patches 410 into the software program.

In cases where software patches "collide," meaning that software files in two or more patches are the same but possibly different versions of the same files or components, then collision information 425 may be presented to an engineer or other person or machine software attempting to determine a least risk order. The collision information 425 may optionally be in the form of a metric (e.g., how many or percentage of files or components in the patches may collide with each other during installation of the patches 410-1, 410-2, . . . , 410-n).

The collision information 425 can be used in any number of ways to establish the order of installation 420-2. For example, the absolute number of common files within the patches can be used, where patches having the most number of common files can be installed last, with priority being given to software patches that have software files created at a later date. Other forms of determining the installation order may be done using other techniques.

Figure 5:
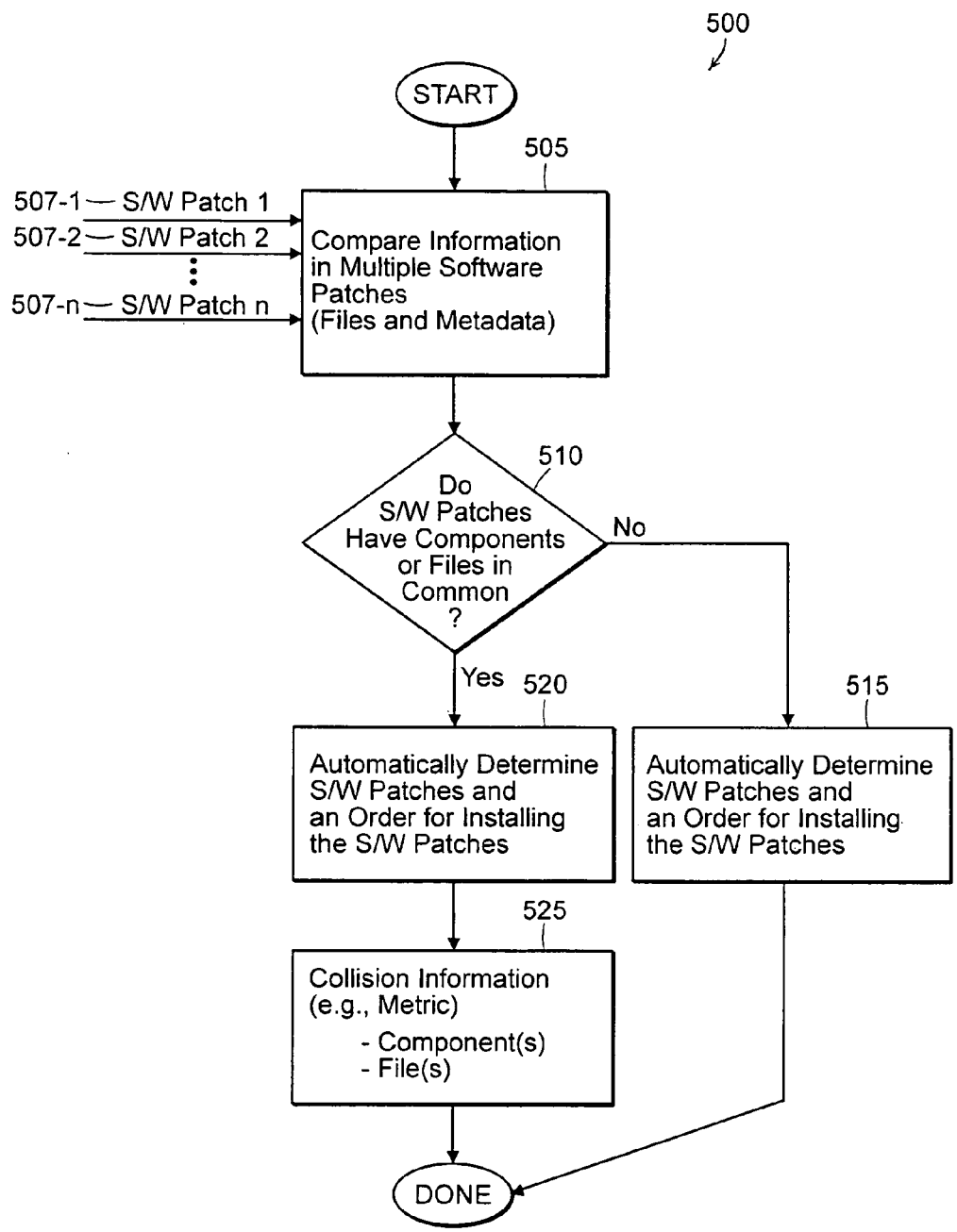
FIG. 5 is a flow diagram of a process that may be used in the software patch installer builder of FIG. 4.

FIG. 5 is a flow diagram of an embodiment of a process 500 that may be performed in the software patch installer builder 405 of FIG. 4. Referring to the flow diagram, the process 500 compares multiple software patches 507-1, 507-2, . . . , 507-n by inspecting information (step 505) contained therein, such as files and metadata. If some or all of the software patches have components or files in common (step 510), the process 500 may automatically determine software patches and an order for installing the software patches (step 520) for installing into a software program. Collision information, such as metrics, regarding components or files in the patches may be reported or presented (step 525) based on the determination of step 520. If the software patches do not have components or files in common (step 510), the process 500 may only determine the software patches and an order for installing the software patches (step 515) before completion.

It should be understood that some of the steps in the process 500 may be combined, performed in another manner, removed, or use other steps. Further, it should be understood that some or all of the steps in the process 500 of FIG. 5 or any of the other example software processes described hereinabove in reference to FIGS. 1-4 may be implemented in software that can be stored as executable instructions on a computer readable medium, such as a CD-ROM, and loaded and executed by a processor anywhere on a computer network, including a target machine into which the software patches are to be installed. It should also be understood that executable instructions may be downloaded via a computer network and executed by a processor receiving the executable instructions.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method executing on a software patch installer builder for determining an order for installing software patches on a system, comprising:
    between upgrades to a software program, determining whether at least two of multiple software patches include files in common by comparing information in the multiple software patches, including: (i) files created or modified to fix software errors in the software program and (ii) metadata referring to the files, each of the software patches representing a correction to a problem with a computer program and posing a level of risk that changes made by one software patch will overwrite changes made by another software patch, the changes made by each software patch not including changes made by other software patches;
    in response to at least two of the multiple software patches including files in common, automatically determining an order in which changes made by each of the at least two of the multiple software patches with files in common are to be performed on the software program that minimizes a level of risk that changes made by one software patch will overwrite changes made by another software patch, wherein the level of risk is determined based at least in part upon: (i) number or percent of overlapping files between the at least two software patches, and (ii) metadata pertaining to creation date and filename of the overlapping files between the at least two software patches; and
    automatically generating a master software patch for installation on the system, including the files in the determined order for installing the software patches.

2. The method according to claim 1, wherein the files in a given software patch include files that fix unrelated software errors.

3. The method according to claim 1, wherein at least a subset of the files in at least a subset of the software patches are different versions of the same files.

4. The method according to claim 1, wherein automatically determining the order includes comparing a creation date or a modification date stored in the metadata and sorting the files based on the creation date or the modification date.

5. The method according to claim 1, wherein the software patches correct operation of the software program in multiple versions of the software program.

6. The method according to claim 1, wherein automatically determining the order comprises:
    determining an order for installing the software patches with minimized risk of (i) overwriting a file written at a later date with the same file written at an earlier date or (ii) introducing a software error corrected in the file written at the later date; and
    generating the master software patch with the order having the minimized risk.

7. The method according to claim 1, wherein automatically determining the order includes reducing a risk of reintroducing at least one of the software errors in the software program or introducing a new software error in the software program.

8. The method according to claim 1, wherein the software patches further include components that include the files, and further comprising:
    comparing metadata referring to the components; and
    wherein automatically determining the order includes automatically determining the order based on results of comparing the metadata.

9. The method according to claim 1, wherein automatically determining the order includes automatically determining metrics representing risk of reintroducing the software errors or introducing new software errors.

10. The method according to claim 1, wherein the software patches are associated with multiple branches of development that cannot be concurrently installed to correct the errors in the software program in a manner resulting in error-free operation of the software program.

11. The method of claim 1, further comprising automatically generating a master software patch for installation on the system by determining an overall level of risk such that software patches having a higher number of overlapping files are applied subsequent to software patches having a lower number of overlapping files in order to minimize the overall level of risk.

12. An apparatus for determining an order for installing software patches on a target system, comprising:
    a processor operating a software patch manager routine that between upgrades to a software program:
        (a) determines whether at least two of multiple software patches include files in common by comparing information in the multiple software patches, including: (i) files created or modified to fix software errors in the software program and (ii) metadata referring to the files, each of the software patches representing a correction to a problem with a computer program and posing a level of risk that changes made by one software patch will overwrite changes made by another software patch, the changes made by each software patch not including changes made by other software patches,
        (b) in response to at least two of the multiple software patches including files in common, automatically determines an order in which changes made by each of the at least two of the multiple software patches with files in common are to be performed on the software program that minimizes a level of risk that changes made by one software patch will overwrite changes made by another software patch, wherein the level of risk is determined based at least in part upon: (i) number or percent of overlapping files between the at least two software patches, and (ii) metadata pertaining to creation date and filename of the overlapping files between the at least two software patches; and
        (c) automatically generates a master software patch for installation on the target system, including the files in the determined order for installing the software patches; and
    a transmitter in communication with the processor that transmits the master software patch to a target system.

13. The apparatus according to claim 12, wherein the files in a given software patch include files that fix unrelated software errors.

14. The apparatus according to claim 12, wherein at least a subset of the files in at least a subset of the software patches are different versions of the same files.

15. The apparatus according to claim 12, wherein the software patch manager routine automatically determines the order by comparing a creation date or a modification date stored in the metadata and sorting the files based on the creation date or the modification date.

16. The apparatus according to claim 12, wherein the software patches correct operation of the software program in multiple versions of the software program.

17. The apparatus according to claim 12, wherein to automatically determine the order, the software patch manager routine:
   determines an order for installing the software patches having minimized risk of (i) overwriting a file written at a later date with the same file written at an earlier date or (ii) introducing a software error corrected in the file written at the later date; and
   generates the master software patch with the order having the minimized risk.

18. The apparatus according to claim 12, wherein automatically determining the order includes reducing a risk of reintroducing at least one of the software errors in the software program or introducing a new software error in the software program.

19. The apparatus according to claim 12, wherein the software patches further include components that include the files, and the software patch manager routine:
   compares metadata referring to the components; and
   automatically determines the order based on results of comparing the metadata.

20. The apparatus according to claim 12, wherein the software patch manager routine automatically determines metrics representing risk of reintroducing the software errors or introducing new software errors.

21. The apparatus according to claim 12, wherein the software patches are associated with multiple branches of development that cannot be concurrently installed to correct the errors in the software program in a manner resulting in error-free operation of the software program.

22. The apparatus of claim 12, wherein the software patch management routine automatically generates a master software patch for installation on the system by determining an overall level of risk such that software patches having a higher number of overlapping files are applied subsequent to software patches having a lower number of overlapping files in order to minimize the overall level of risk.

23. A non-transitory computer-readable medium having stored thereon sequences of instructions, the sequences of instructions including instructions, when executed by a digital processor, causes the processor to:
   between upgrades to a software program on a system, determine whether at least two of the multiple software patches include files in common by comparing information in the multiple software patches, including: (i) files created or modified to fix software errors in the software program and (ii) metadata referring to the files, each of the software patches representing a correction to a problem with a computer program and posing a level of risk that changes made by one software patch will overwrite changes made by another software patch, the changes made by each software patch not including changes made by other software patches;
   in response to at least two of the multiple software patches including files in common, automatically determine an order in which changes made by each of the at least two of the multiple software patches with files in common are to be performed on the software program that minimizes a level of risk that changes made by one software patch will overwrite changes made by an other software patch, wherein the level of risk is determined based at least in part upon: (i) number or percent of overlapping files between the at least two software patches, and (ii) metadata pertaining to creation date and filename of the overlapping files between the at least two software patches; and
   automatically generate a master software patch for installation on the system, including the files in the determined order for installing the software patches.

24. The non-transitory computer-readable medium according to claim 23, wherein the files in a given software patch include files that fix unrelated software errors.

25. The non-transitory computer-readable medium according to claim 23, wherein at least a subset of the files in at least a subset of the software patches are different versions of the same files.

26. The non-transitory computer-readable medium according to claim 23, wherein the instructions cause the processor to automatically determine the order at least in part by comparing a creation date or a modification date stored in the metadata and sorting the files based on the creation date or the modification date.

27. The non-transitory computer-readable medium according to claim 23, wherein the software patches correct operation of the software program in multiple versions of the software program.

28. The non-transitory computer-readable medium according to claim 23, wherein the instructions that cause the processor to automatically determine the order comprise instructions that cause the processor to:
   determine an order for installing the software patches with minimized risk of (i) overwriting a file written at a later date with the same file written at an earlier date or (ii) introducing a software error corrected in the file written at the later date; and
   generate the master software patch with the order having the minimized risk.

29. The non-transitory computer-readable medium according to claim 23, wherein the instructions that cause the processor to automatically determine the order comprise instructions that cause the processor to reduce a risk of reintroducing at least one of the software errors in the software program or introducing a new software error in the software program.

30. The non-transitory computer-readable medium according to claim 23, wherein the software patches further include components that include the files, and further comprising instructions that cause the processor to:
   compare metadata referring to the components; and
   wherein the instructions that cause the processor to automatically determine the order comprise instructions that cause the processor to automatically determine the order based on results of comparing the metadata.

31. The non-transitory computer-readable medium according to claim 23, wherein the instructions that cause the processor to automatically determine the order comprise instructions that cause the processor to automatically determine metrics representing risk of reintroducing the software errors or introducing new software errors.

32. The non-transitory computer-readable medium according to claim 23, wherein the software patches are associated with multiple branches of development that cannot be concurrently installed to correct the errors in the software program in a manner resulting in error-free operation of the software program.

33. The non-transitory computer readable medium according to claim 23, further comprising instructions operable to automatically generate a master software patch for installation on the system by determining an overall level of risk such that software patches having a higher number of overlapping files are applied subsequent to software patches having a lower number of overlapping files in order to minimize the overall level of risk.

* * * * *